M. F. MURRAY.
AUTOMATIC TEMPERATURE REGULATOR.
APPLICATION FILED AUG. 3, 1910.
1,015,204.
Patented Jan. 16, 1912.
2 SHEETS—SHEET 1.
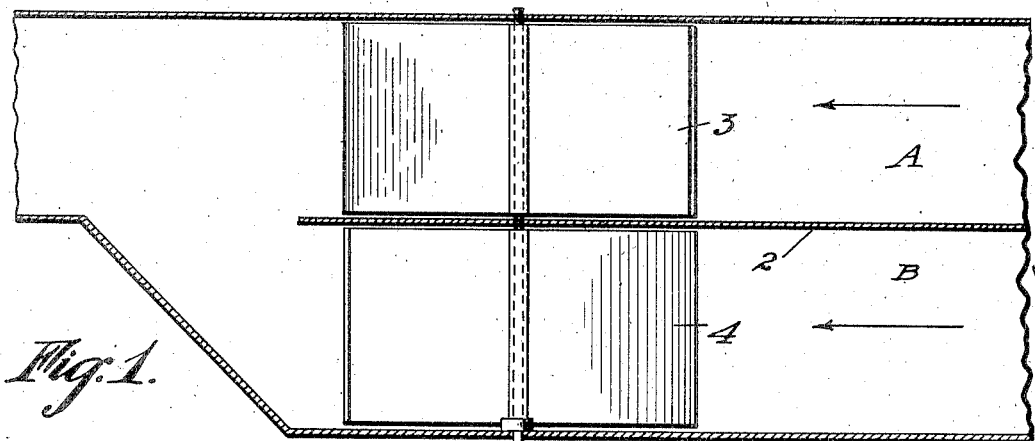
Fig. 1.
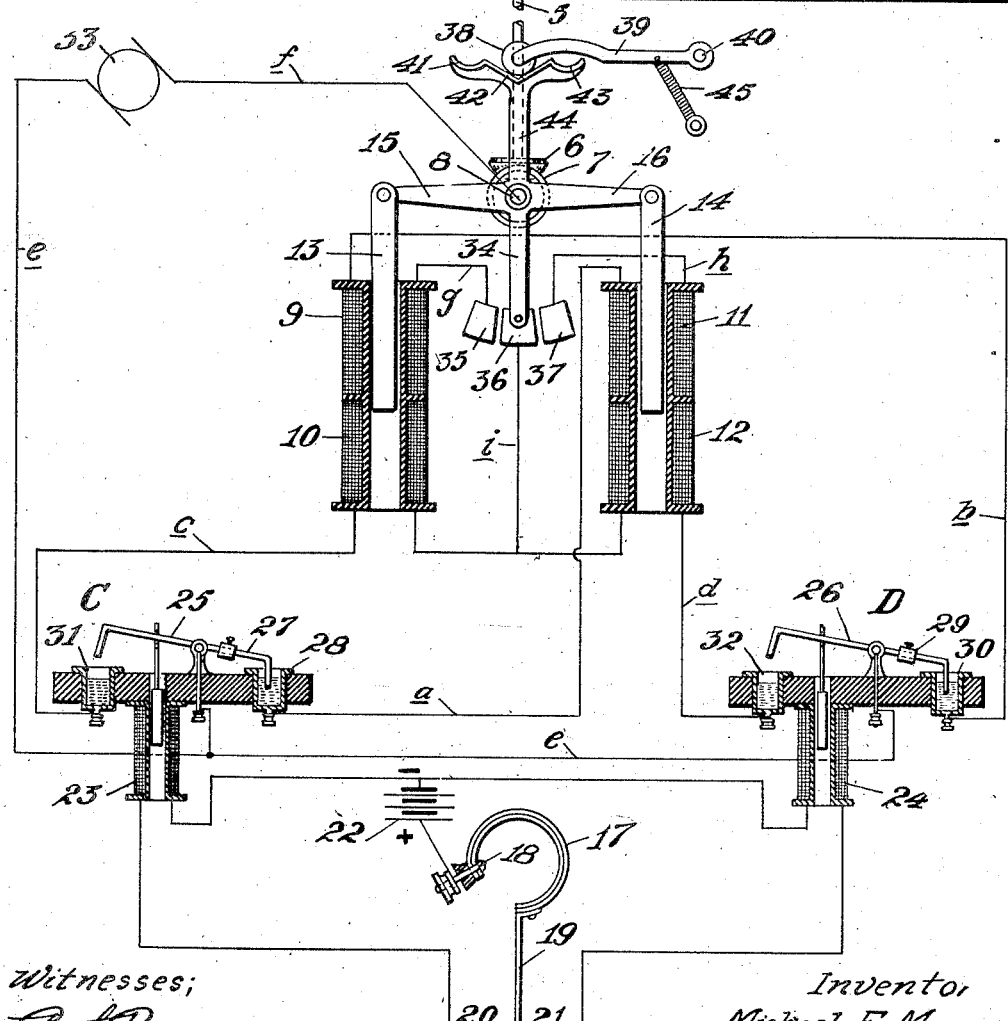
Witnesses;
Inventor
Michael F. Murray
By Geo. H. Strong.
His Attorney.

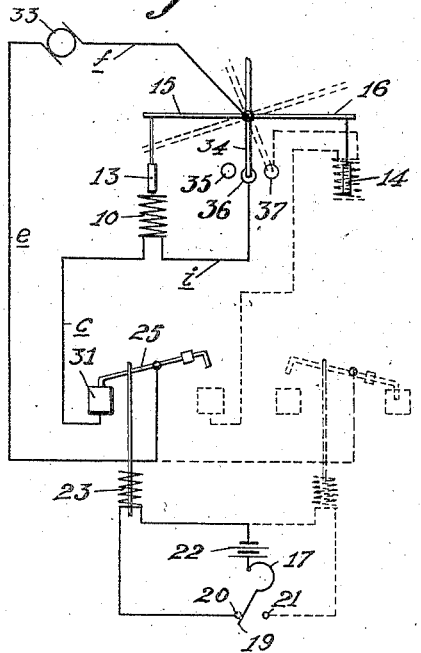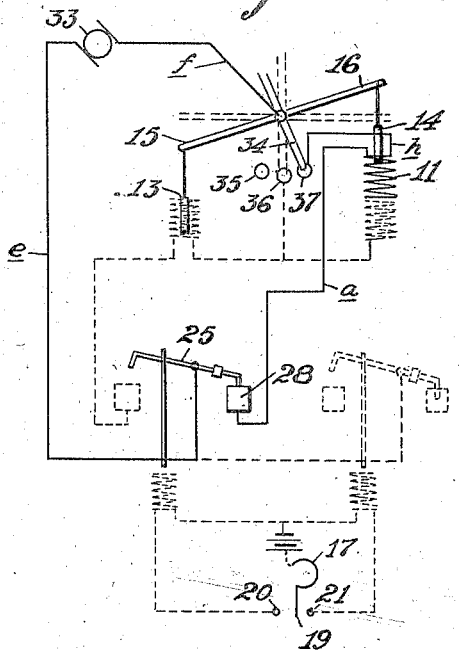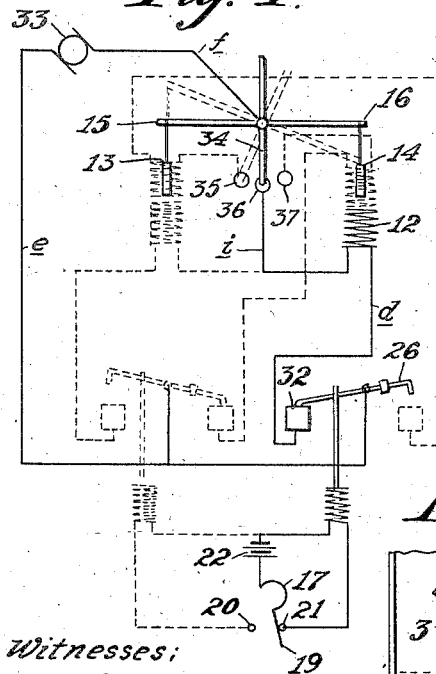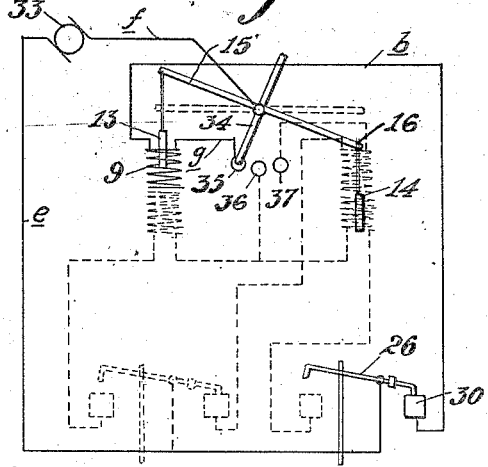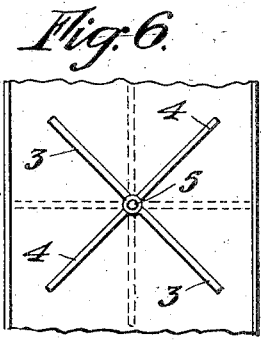

UNITED STATES PATENT OFFICE.

MICHAEL F. MURRAY, OF OAKLAND, CALIFORNIA.

AUTOMATIC TEMPERATURE-REGULATOR.

1,015,204.

Specification of Letters Patent.  Patented Jan. 16, 1912.

Application filed August 3, 1910. Serial No. 575,325.

*To all whom it may concern:*

Be it known that I, MICHAEL F. MURRAY, citizen of the United States, residing at Oakland, in the county of Alameda and State of California, have invented new and useful Improvements in Automatic Temperature-Regulators, of which the following is a specification.

This invention relates to a device for regulating the temperature of the atmosphere in rooms and apartments, and particularly pertains to the mechanism for automatically operating the temperature regulating apparatus.

The object of this invention is to provide a temperature regulator which is especially adapted for use in school buildings, libraries, and other rooms where evenness of temperature is desirable, and by which the damper may be set at an intermediate position to mix both hot and cold air, and which is simple in construction, and positive in its operation.

Another object is to provide an automatic means for operating a gate or valve controlling hot and cold air currents, and which will maintain a uniform temperature at all times in a room or apartment without the aid of an attendant.

Another object is to provide an electrically operated mechanism for operating valves, and the like, which is especially designed for use in operating valves that assume three positions, and which will admit of the valves being disposed at a distance from the point of operation.

A more especial object is to provide a thermostat and connections of such a character that a gate or valve controlling the air currents may be partially opened or closed, and subsequently be more fully opened or closed, depending on the temperature and the requirements of the apartment.

The invention consists of the parts and the construction and combination of parts as hereinafter more fully described and claimed, having reference to the accompanying drawings, in which—

Figure 1 is an elevational view of the invention partly in section, showing diagrammatically the system of electrical connections. Figs. 2, 3, 4 and 5 are diagrams illustrating the various circuits of the electric current in moving the valve from one position to another. Fig. 6 is a plan view illustrating the several positions of the valve blades.

In the drawings, A represents a hot air conduit or passage, and B is a cold air conduit; the source of supply to each being disposed at any suitable point and generated in any desired manner. The hot air conduit A is shown as disposed above the cold air conduit B, and they are separated from each other by a horizontal partition, 2, or other desired means. These conduits lead to and open into the room in which the temperature is to be regulated. Situated within the conduits A—B are dampers or valves, 3, 4, each of which is supported upon a vertically disposed shaft, 5, at right angles to the other; the shaft 5 being mounted in the casing of the conduits A—B. The dampers 3, 4, are so mounted on the shaft 5, that when the damper 3 in the hot air chamber A is extending laterally across the conduit A, and completely closing it against the passage of heated air, the damper 4 in the conduit B extends longitudinally therein and permits of the flow of cold air into the room, to the full capacity of the conduit B; in like manner, when the cold air conduit B is closed by the damper 4, the conduit A is opened. It will also be seen that by rotating the shaft 5 an eighth-turn, both the conduits A, B, will be partly opened, as shown in full lines in Fig. 6, so that both cold and hot air will flow through A and B to be mixed in the room. This is important.

The shaft 5 is shown as extending through the bottom of the conduit B, and has a beveled pinion 6, secured to its lower end, which meshes with a similar pinion 7 on a horizontally disposed shaft 8. This shaft 8 is adapted to be rocked from side to side, to open or close the dampers 3, 4, more or less, by means of the two-part solenoid magnets 9, 10, 11, 12, as later described, the cores, 13, 14, of the magnets being pivotally suspended from the outer ends of cross arms 15, 16, mounted on the shaft 8.

The separate magnets 9, 10, 11, 12, are designed to be energized by an electric current, the flow of which is governed by suitable circuit breakers, indicated at C and D, controlled by a thermostat, 17. The thermostat 17 is located in the room to which the air from the conduits A, B is to be delivered, and may be of any suitable type. It is here shown as composed of two metallic bands of different degrees of expansion and contraction, which are rigidly mounted at one end, as at 18, and carry an arm 19, on the other end. The arm 19 is disposed between two terminals, 20 21, of an electric circuit, and acts as a contact piece to make and break a circuit with either of the terminals 20, 21, as later described. The thermostat, 17, is connected directly to the positive pole of an electric supply as a battery, 22. The terminal 20, is connected to the negative pole of the battery 22, through a solenoid magnet, 23; and the terminal, 21, also connects with the negative pole of the battery 22 through a solenoid magnet 24. The magnet 23 is designed to operate a core attached to the lever 25 of the circuit breaker C, and the magnet 24 is to operate the lever 26 of the circuit breaker D.

The lever 25 is weighted at 27 so as to normally retain one end of the lever immersed in a mercury-pot, 28, upon which an electrical conductor, $a$, leads to one side of the magnet 11. The lever 26 is likewise weighted at 29 so as to normally retain one end of the lever immersed in a mercury-pot 30, from which a conductor, $b$, leads to the magnet 9. The opposite end of the lever 25 is adapted to be drawn downward by the magnet 23, so as to be immersed in a mercury-pot, 31, connected to the magnet 10 by a conductor $c$, and the other end of the lever 26 is adapted to be drawn downward by the magnet 24, so as to contact a mercury-pot, 32, which connects with the magnet 12 by means of a conductor $d$.

The levers 25, 26, are constantly energized through a conductor $e$, leading from one pole of any suitable source of electrical power, 33, usually the service wires of an electric lighting system, the other pole of which is connected by a conductor, $f$, to a contact piece or brush, 34, carried on the shaft 8. The lower end of the contact piece or brush 34, is adapted to contact either one of three terminal plates 35, 36, 37, as it is moved from side to side by the rocking of the shaft 8. The plate 35 is connected by a conductor, $g$, to the magnet 9, the plate 37 by a conductor, $h$, to the magnet 11, and the plate 36 by a conductor, $i$, to the magnets 10 and 12.

By referring to Fig. 1, it will be seen that when the arm 19 of the thermostat 17 is not in contact with either of the terminals 20, 21, there will be no current passing through either of the solenoid magnets, 23, 24, and consequently the armatures of these magnets which are attached to the levers 25, 26, will be in their uppermost position by reason of the weights 28, 29, overbalancing them. In this position, which is the normal position, the dampers, 3, 4, will be in the intermediate position shown in Fig. 6, with the conduits A, B, both partly open; the contact brush, 34, being in contact with the central terminal plate, 36, see Fig. 1.

In operation, assuming the position of the parts to be as in Fig. 1, and the temperature of the room to fall to a certain undesired degree, the thermostat 17 will contract so that the arm 19 will contact the terminal 20, and thus complete a circuit to operate the magnet 23 to pull down on the lever 25 and cause it to be thrown out of contact with the pot 28, as shown in Fig. 2. As soon as this is accomplished, a circuit is completed through the wire $c$, lever 25, wire $c$, magnet 10, wire $i$, brush 34, and wire $f$; thereby operating the magnet 10 to pull the core down into the position shown in dotted lines in Fig. 2, thereby tilting the arms 15, 16, into the position shown in Fig. 3, and rocking the shaft 8 so as to turn the shaft 5 one-eighth of a revolution, and close the conduit B; it being understood that the commutator sections 35, 36, 37, are disposed at distances apart corresponding to a 45 degree swing of the dampers 3, 4, on their axis. It will be here noted that the circuit just described will be broken the instant the brush 34 is thrown out of contact with the plate 36 by the rocking of the shaft 8, and that the brush 34 will now contact the section 37, and be in position to complete a circuit through the magnet 11, when the lever 25 again drops back into contact with the pot 28, which it does when the thermostat 17 returns to its normal position as shown in Fig. 3. A rise of temperature expands the thermostat bands, 17, so as to cause the arm 19 to contact the terminal 21, thereby completing a circuit which will energize the magnet 24, and thereby operate the lever 26 so as to energize the magnet 12, and rock the lever 16, so as to rotate the shaft 8, and cause the damper 3 to close the conduit A. The flow of current in this case is illustrated in Fig. 4. The temperature again being brought to the normal, the arm 19 on the thermostat 17 again returns to its intermediate position, thereby breaking the circuit which operates the magnet 24, thus allowing the lever 26 to return to its normal position, as shown in Fig. 5, and thereby completing a circuit through conductor $f$, arm 34, conductor $g$, solenoid 9, wire $b$, lever 26, and conductor $e$, so as to operate the solenoid 9 to rock the shaft 8 through the arm 15, and return the damper blades, 3, 4, back to the normal position shown in Fig. 1.

It will be observed that both parts of the two-part solenoids, operate upon each core, 13, 14; and that each magnet section 9—10, 11—12, is operated independent of the other. It will also be noted that at no time is there a long continued circuit through either of the solenoid magnets, 9, 10, 11, 12, by reason of the brush 34 breaking the circuit the moment the solenoid is operated. The circuit through the solenoids 23, 24, will be only of such duration as is necessary for the temperature to rise or lower to its normal degree.

A brake is provided with which to limit the swing of the shaft 8, and insure the dampers, 3, 4, stopping in the proper places. This brake consists of a roller, 38, mounted on an arm, 39, pivoted at 40, which is adapted to engage notches 41, 42, 43 formed in a standard 44, mounted on the shaft 8 and rigid with the arms 15, 16. The roller 38 is retained in engagement with either of the notches 41, 42, 43, by means of a spring, 45, which exerts a downward pull on the arm 39.

When the dampers, 3, 4, and the contact brush 34, are in their intermediate position, the roller 38 is in engagement with the central notch 41, as shown in Fig. 1; when the damper 3 closes the conduit A, and the brush 34 registers with the plate 35, the roller 38 engages the notch 41, and when the damper 4 closes the conduit B, and the brush 34 registers with the plate 37, the roller 38 will engage the notch 43.

The shaft 5 on which the dampers 3, 4, are mounted, is shown as operated through a geared connection with the shaft 8, but it is apparent that any other suitable means of transmitting motion from the shaft 8 to the shaft 5 may be employed.

While I have shown and described the gates or dampers, 3, 4, as operated by and both mounted on the same spindle, it is manifest that two of them together form a valve common to both air passages, and so disposed as to open one passage while closing the other.

Having thus described my invention, what I claim and desire to secure by Letters Patent is—

1. In a temperature regulator, hot and cold air ducts, a gate movable to open one duct and to close the other, a rock shaft on which said gate is mounted, an electrically controlled means for imparting to said gate a step-by-step opening or closing movement, said last named means including a lever fulcrumed between its ends and having connections with the rock shaft, solenoids, acting successively to rock said lever, means for controlling said solenoids including a series of commutator segments corresponding to the step-by-step movements of a valve, a brush member carried by the lever and movable over said commutator segments, and electrical connections with the segments, solenoids and brush.

2. In a temperature regulator, hot and cold air ducts, a gate movable to open one duct and to close the other, a rock shaft on which said gate is mounted, an electrically controlled means for imparting to said gate a step-by-step opening or closing movement, said last named means including a lever fulcrumed between its ends and having connections with the rock shaft, solenoids, acting successively to rock said lever, means for controlling said solenoids including a series of commutator segments corresponding to the step-by-step movements of a valve, a brush member carried by the lever and movable over said commutator segments, electrical connections with the segments, solenoids and brush, circuit breakers, and solenoids controlled by a thermostat for operating said circuit breakers to successively energize the before-mentioned solenoids.

3. In a temperature regulating apparatus, the combination with a rock-shaft having oppositely extending arms, and magnet cores pivotally mounted on the outer ends of said arms, of a normally deënergized solenoid for each core, each of said solenoids being formed of two adjacent superposed parts arranged in line with a core, each part of a solenoid being energized separately whereby said parts act one at a time upon a core so as to actuate the latter to move the rock shaft and its arms into one of three definite positions, thermostatic means for energizing the separate parts of the solenoid, a generator circuit in which said solenoids are disposed, said circuit being connected with one terminal of each part of the coil, commutator segments connected with the other terminal of said coils, means controlled by the thermostat for opening and closing said circuit to energize each part of a solenoid separately, said last named means comprising a pair of circuit breakers having double contacts, one of the contacts of each circuit breaker being normally closed and magnets of a battery circuit adapted to be controlled by the thermostat to operate the circuit breakers to protect the normally closed contact and close the other contact.

4. In a temperature regulator, the combination with a gate in an air duct adapted to assume an open, a closed, and an intermediate position, a rock shaft by which said gate is operated, oppositely extending lever arms on said shaft, a core attached to each arm, a pair of normally deënergized superposed solenoid coils adapted to act separately on said cores to actuate said rock shaft and operate the gate, a generator circuit connected with one terminal of each of said coils, commutator segments connected with the other terminals of said coils, a brush wiper on the generator circuit and movable over said segments by the rocking of said rock shaft, circuit breakers disposed in the generator circuit between the generator thereof and the coils, said circuit breaker operating to control the flow of current to said coils.

5. In a temperature regulator, the combination with a gate in an air duct adapted to assume an open, a closed, and an intermediate position, a rock shaft by which said gate is operated, oppositely extending lever arms on said shaft, a core attached to each arm, a pair of normally deënergized superposed solenoid coils adapted to act separately on said cores to actuate said rock shaft and operate the gate, a generator circuit connected with one terminal of each of said coils, commutator segments connected with the other terminals of said coils, and a brush wiper on the generator circuit and movable over said segments by the rocking of said rock shaft, circuit breakers disposed in the generator circuit between the generator thereof and the coils, said circuit breakers operating to control the flow of current to said coils, and means for actuating said circuit breakers comprising magnets and means for controlling said magnets by a thermostat.

6. In a temperature regulator, the combination with a gate in an air duct adapted to assume an open, a closed and an intermediate position, a rock shaft by which said gate is operated, oppositely extending lever arms on said shaft, a core attached to each arm, a pair of normally deënergized superposed solenoid coils adapted to act separately on said cores to actuate said rock shaft and operate the gate, yieldable means for temporarily holding the rock shaft and gate in any one of their three positions, a generator circuit connected with one terminal of each of said coils, commutator segments connected with the other terminals of said coils, a brush wiper on the generator circuit and movable over said segments by the rocking of said rock shaft; circuit breakers disposed in the generator circuit between the generator thereof and the coils, said circuit breaker operating to control the flow of current to said coils, and means for actuating said circuit breakers comprising magnets and means for controlling said magnets by a thermostat.

In testimony whereof I, have hereunto set my hand in the presence of two subscribing witnesses.

MICHAEL F. MURRAY.

Witnesses:
 HARRISON S. ROBINSON,
 HARRY A. ENCELL.